United States Patent
Mouton et al.

(10) Patent No.: US 9,944,405 B2
(45) Date of Patent: Apr. 17, 2018

(54) METHOD AND A DEVICE FOR MARKING THE GROUND FOR AN AIRCRAFT IN FLIGHT, AND AN AIRCRAFT INCLUDING THE DEVICE

(71) Applicant: AIRBUS HELICOPTERS, Marignane (FR)

(72) Inventors: Christophe Mouton, Tarascon (FR); Herve Routin, Aix en Provence (FR)

(73) Assignee: Airbus Helicopters, Marignane (FR)

( * ) Notice: Subject to any disclaimer, the term of this patent is extended or adjusted under 35 U.S.C. 154(b) by 0 days.

(21) Appl. No.: 15/079,161

(22) Filed: Mar. 24, 2016

(65) Prior Publication Data
US 2016/0280393 A1 Sep. 29, 2016

(30) Foreign Application Priority Data
Mar. 27, 2015 (FR) ...................................... 15 00620

(51) Int. Cl.
| | |
|---|---|
| *B64F 1/18* | (2006.01) |
| *B64D 45/08* | (2006.01) |
| *B64C 27/00* | (2006.01) |
| *B64D 47/04* | (2006.01) |
| *B64D 47/06* | (2006.01) |
| *B64D 45/00* | (2006.01) |

(52) U.S. Cl.
CPC ............ *B64D 45/08* (2013.01); *B64C 27/006* (2013.01); *B64D 47/04* (2013.01); *B64D 47/06* (2013.01); *B64D 2045/008* (2013.01)

(58) Field of Classification Search
None
See application file for complete search history.

(56) References Cited

U.S. PATENT DOCUMENTS

| | | | | | |
|---|---|---|---|---|---|
| 2,316,751 | A | * | 4/1943 | Adler, Jr. ................. | G01C 3/08 116/28 R |
| 3,610,821 | A | * | 10/1971 | Narbaits-Jaureguy . | G01C 5/005 244/1 R |
| 3,633,157 | A | * | 1/1972 | Schuh ....................... | B64F 1/18 340/946 |

(Continued)

FOREIGN PATENT DOCUMENTS

| | | |
|---|---|---|
| CN | 102998885 | 3/2013 |
| CN | 104036475 | 9/2014 |

(Continued)

OTHER PUBLICATIONS

French Search Report for French Application No. 1500620, Completed by the French Patent Office dated Jan. 13, 2015, 6 Pages.

(Continued)

*Primary Examiner* — Curtis King
(74) *Attorney, Agent, or Firm* — Brooks Kushman P.C.

(57) ABSTRACT

A method of marking a landing zone on ground for an aircraft in flight. The aircraft projects on the ground a light shape referred to as a "projected light shape" comprising at least one line of light defining a geometrical surface, the aircraft tending to place at least a portion of landing gear of the aircraft on the geometrical surface, the projected light shape being identical regardless of the position of the projector in air space.

20 Claims, 4 Drawing Sheets

(56) References Cited

U.S. PATENT DOCUMENTS

| | | | | |
|---|---|---|---|---|
| 3,693,143 A * | 9/1972 | Kennedy | | G01S 13/46 340/972 |
| 3,886,306 A * | 5/1975 | Fayard | | B64D 47/08 244/17.11 |
| 3,895,388 A * | 7/1975 | Townsend | | G03B 9/08 348/31 |
| 4,177,579 A * | 12/1979 | Peters | | G09B 9/301 348/123 |
| 4,209,767 A * | 6/1980 | Flanders | | G08G 5/0021 340/947 |
| 4,239,355 A * | 12/1980 | Brown, Jr. | | G09B 9/32 353/11 |
| 4,251,929 A * | 2/1981 | Precicaud | | G09B 9/326 353/120 |
| 4,605,294 A * | 8/1986 | Bourdier | | A47F 7/19 353/28 |
| 4,916,445 A | 4/1990 | Crossley | | |
| 4,995,722 A * | 2/1991 | Sutour | | B64F 1/12 244/17.17 |
| 5,315,296 A * | 5/1994 | Kaiser | | G05D 1/0646 340/946 |
| 5,371,581 A * | 12/1994 | Wangler | | G01S 7/51 340/946 |
| 6,012,001 A * | 1/2000 | Scully | | G08G 5/0086 342/33 |
| 6,193,190 B1 * | 2/2001 | Nance | | B64F 1/007 244/114 R |
| 6,927,702 B2 * | 8/2005 | Wiplinger | | B64D 45/0005 340/960 |
| 7,722,192 B2 * | 5/2010 | Huonker | | B64D 11/0015 340/945 |
| 8,579,480 B2 | 11/2013 | Willeke et al. | | |
| 8,630,755 B2 * | 1/2014 | Ohtomo | | B64C 39/024 348/144 |
| 8,666,571 B2 * | 3/2014 | Ohtomo | | G01C 11/04 244/17.11 |
| 8,918,234 B2 * | 12/2014 | Covington | | G08G 5/02 701/3 |
| 8,953,933 B2 * | 2/2015 | Ohtomo | | G01C 11/00 244/190 |
| 9,007,461 B2 * | 4/2015 | Ohtomo | | H04N 13/02 345/419 |
| 9,013,576 B2 * | 4/2015 | Ohtomo | | G01C 11/02 348/142 |
| 9,020,666 B2 * | 4/2015 | Ohtomo | | G05D 1/0669 701/15 |
| 9,319,502 B2 * | 4/2016 | Ueno | | H04M 1/21 |
| 9,567,102 B1 * | 2/2017 | Ross | | B64D 45/00 |
| 2003/0058653 A1 | 3/2003 | Konicke et al. | | |
| 2004/0183697 A1 * | 9/2004 | Rogers | | G01C 23/00 340/971 |
| 2005/0225189 A1 * | 10/2005 | Voigt | | G01C 19/30 310/112 |
| 2008/0071431 A1 * | 3/2008 | Dockter | | B63B 35/50 701/3 |
| 2008/0313937 A1 * | 12/2008 | Boyce | | G09F 19/18 40/212 |
| 2010/0073198 A1 * | 3/2010 | Wegner | | G01C 23/00 340/946 |
| 2010/0302072 A1 | 12/2010 | Larcher | | |
| 2011/0001062 A1 * | 1/2011 | Herman | | F41H 11/02 250/492.1 |
| 2011/0018864 A1 * | 1/2011 | Ishibashi | | G06F 3/011 345/419 |
| 2011/0307126 A1 * | 12/2011 | Hogstrom | | G05D 1/0684 701/16 |
| 2012/0029686 A1 * | 2/2012 | Ban | | B25J 9/1679 700/218 |
| 2012/0081360 A1 * | 4/2012 | Uehira | | G01B 11/2513 345/419 |
| 2012/0130566 A1 * | 5/2012 | Anderson | | G05D 1/0684 701/16 |
| 2012/0158222 A1 * | 6/2012 | Ehlin | | G01S 17/023 701/16 |
| 2012/0212712 A1 * | 8/2012 | Scanlon | | G03B 21/562 353/121 |
| 2012/0261516 A1 * | 10/2012 | Gilliland | | G01S 17/107 244/183 |
| 2012/0262548 A1 * | 10/2012 | Choe | | G01B 11/2513 348/45 |
| 2012/0313974 A1 * | 12/2012 | Ueno | | H04M 1/21 345/668 |
| 2013/0182449 A1 * | 7/2013 | Fidanza | | B64D 47/04 362/470 |
| 2013/0187785 A1 * | 7/2013 | McIntosh | | B66F 17/006 340/686.6 |
| 2014/0070052 A1 * | 3/2014 | Kang | | B64F 1/18 244/114 R |
| 2015/0130644 A1 * | 5/2015 | Kiel | | B64D 47/04 340/953 |
| 2015/0146442 A1 * | 5/2015 | Bonnefous | | B64D 47/04 362/467 |
| 2016/0027313 A1 * | 1/2016 | Loussides | | G08G 5/0069 701/16 |
| 2016/0286186 A1 * | 9/2016 | Fujiune | | G09G 5/00 |
| 2017/0116867 A1 * | 4/2017 | Cherepinsky | | G08G 5/045 |

FOREIGN PATENT DOCUMENTS

| | | |
|---|---|---|
| DE | 102013009803 | 12/2014 |
| EP | 2433869 | 3/2012 |
| WO | 2015019208 | 2/2015 |

OTHER PUBLICATIONS

French Search Report for French Application No. 1500620, Completed by the French Patent Office dated Jan. 13, 2016, 6 Pages.

* cited by examiner

METHOD AND A DEVICE FOR MARKING THE GROUND FOR AN AIRCRAFT IN FLIGHT, AND AN AIRCRAFT INCLUDING THE DEVICE

CROSS REFERENCE TO RELATED APPLICATION

This application claims priority to French patent application No. FR 15 00620 filed on Mar. 27, 2015, the disclosure of which is incorporated in its entirety by reference herein.

BACKGROUND OF THE INVENTION (1) Field of the Invention

The present invention relates to a method and a device for marking the ground for an aircraft in flight, and to an aircraft provided with the device.

In particular, the invention lies in the technical field of landing lights for signaling that an aircraft is approaching a landing area, in particular at night.

(2) Description of Related Art

Such an aircraft may be authorized to fly at night and thus to land at night on a landing area.

The landing area may be prepared so as to be well lit and well defined. Individuals on the ground can then take care to keep out of the landing area so as to avoid being struck by an aircraft landing on the landing area.

Nevertheless, an aircraft may need to land on a landing area that has little or no lighting. In particular, a short landing aircraft such as a rotorcraft may land on multiple areas, and not necessarily on a runway of an airfield that is well equipped, in particular with lighting means.

Specifically, a rotary wing aircraft can land away from any base in order to bring assistance to individuals, e.g. after an accident.

Consequently, landing an aircraft on an area that is not prepared can turn out to be difficult or indeed dangerous, both for the aircraft and for individuals on the ground.

An aircraft then usually has landing lights for the purpose of lighting the target landing area. Landing lights tend in particular to enable potential dangers for the aircraft to be identified on the ground, such as obstacles that may be natural or non-natural.

A landing light emits a light beam from a halogen lamp or from a non-directional high-intensity discharge (HID) lamp. Parabolic mirrors and motors might possibly be used for collimating the light beam in a given direction.

A landing light may also comprise a light-emitting diode (LED) lamp for emitting a light beam. An optical system known as a total internal reflection (TIR) lens can be used for shaping such a light beam.

A landing light is thus restricted to projecting a light beam so that the pilot can see in the dark. On the ground, the light beam covers all of a surface that is round or oval. The light emitted at the periphery of the beam may be perceptibly diffuse and form a light halo.

Furthermore, landing lights can also be used to illuminate a landing zone in order to signal to individuals on the ground that this zone is a landing zone. The individuals then keep out of the illuminated zone in order to avoid being impacted by an aircraft that is landing.

Nevertheless, in an area that presents high ambient brightness, an individual may find difficulty in accurately identifying the zone that is illuminated by the aircraft.

For example, on particular landing zones where numerous vehicles are present, the lights of those vehicles can make it difficult to identify the zone that is being illuminated by an aircraft. By way of illustration, numerous vehicles may be involved in a given area during a rescue mission. Under such circumstances, it can be difficult to identify the zone that is being illuminated by an aircraft while it is landing.

Present-day helicopters are essentially identified by the noise given off by such helicopters. The lighting provided by a landing light can indeed be used to warn individuals that a helicopter is in an approach stage, but that solution is not always satisfactory.

An object of the present invention is thus to propose a method enabling an aircraft to mark accurately the landing zone being targeted by the aircraft.

Documents CN 102998885, CN 104036475, DE 10 2013 009 803, and WO 2015/019208 are mentioned by way of illustration, but they do not form part of the technical field of the invention, and they do not give any teaching on how to solve the above-described problem.

Documents EP 2 433 869, US 2003/0058653, US 2010/0302072, and U.S. Pat. No. 4,916,445 are also known.

BRIEF SUMMARY OF THE INVENTION

The invention thus relates to a method of marking a landing zone on the ground for an aircraft in flight, the landing zone being targeted by an aircraft flying at altitude height lying between a maximum height and a minimum height.

In the method, the aircraft uses a projector to project on the ground a light shape referred to as a "projected light shape" comprising at least one line of light defining a geometrical surface, the aircraft tending to place at least a portion of landing gear of the aircraft on the geometrical surface, the projected light shape being identical regardless of the position of said projector in air space.

In the method, the aircraft emits a light shape that draws a projected light shape on the ground. The term "projected light shape" is used to specify the shape drawn on the ground by the aircraft's projector. This projected light shape comprises at least one line of light, and in particular a line of light that defines a geometrical surface.

By way of example, the geometrical surface is itself not illuminated by the projector projecting the light shape. Consequently, a line of light cannot be considered as being a totally illuminated disk. A line of light in the invention may define a geometrical surface, which geometrical surface may possibly be illuminated at least in part, e.g. by a conventional landing light. The geometrical surface may then represent a landing zone.

Furthermore, the light beam projected on the ground by a conventional landing light presents dimensions that vary as a function of the height of the aircraft. Such a light beam conventionally illuminates a disk of small diameter when the aircraft is at low height, and a disk of large diameter when the aircraft is at high height.

In contrast, in the invention, the projected light shape that is drawn on the ground has unvarying dimensions, i.e. dimensions that remain constant regardless of the position of the projector in air space. Because of the precision of the various instruments, the term "the projected light shape being identical regardless of the position of said projector in air space" means that the dimensions of the projected light shape lie within a restricted range of dimensions, e.g. of the order of within ten percent of the theoretical dimension. By way of illustration, the light circle may have a theoretical diameter of 10 meters but may present a real diameter varying over the range 9 meters to 11 meters.

Consequently, in the invention, the height of the aircraft and the angle of inclination of the projector relative to a terrestrial reference frame do not have any major impact on the shape drawn on the ground by the aircraft.

The geometrical surface thus always represents a zone on which landing gear of the invention will be placed, and thus the landing zone of the aircraft.

Under such circumstances, any individuals present on the ground can easily identify the landing zone.

In addition, this projected light shape is made up of lines of light and not of a beam illuminating all of a round or oval surface. Consequently, the light shape is easier to identify in an environment that is already partially lit by vehicle lights.

The minimum height may be zero. Nevertheless, in order to simplify the lighting device for performing the method, the minimum height may be of the order of 20 meters, and the maximum height may be of the order of 200 meters.

When the aircraft is very close to the ground, it is necessary to use a complex optical system in order to display the required shape.

Likewise, when the aircraft is at high height, the device needs to possess high resolution systems in order to be effective.

The method may also include one or more of the following characteristics.

Under such circumstances, a line of light may describe a circle of light on the ground, with the aircraft tending to place at least a portion of its landing gear inside the circle. Instead of illuminating a disk, the lighting device then generates a circle of light.

A circle presents the advantage of being perfectly identifiable.

The lines of light may also have characteristic colors that differ from the yellow or white colors of landing lights. For example, the lines of light may be green or red in color.

Furthermore, at least one line of light may represent a life-size projection on the ground of a member of the aircraft, the projection being located in register with the location that ought to be occupied by said member after landing.

The light shape projected on the ground may have various aspects.

Nevertheless, a projected light shape may advantageously be a life-size representation of a member of the aircraft. This characteristic makes it even easier for individuals present on the ground to identify the aircraft. Likewise, this characteristic makes the work of a pilot easier by representing at least part of the footprint of the aircraft on the ground once it has landed.

For example, the aircraft includes a rotary wing having blades, the blades having respective free ends that, in rotation, describe a circle referred to as the "lift circle", and a line of light describes a circle of light referred to as the "inner circle" that represents a life-size projection onto the ground of said lift circle.

Consequently, the projector emits a light shape referred to as the "emitted light shape" that projects a projected light shape onto the ground describing a circle representative of the size of the aircraft's rotary wing.

Because of this system, and regardless of height, the pilot can thus visualize the position of the rotary wing after landing. The pilot can then in particular easily detect items that are dangerous for the rotary wing in the illuminated zone.

Likewise, individuals present on the ground can determine where the rotary wing of the aircraft is going to be, and can thus avoid remaining in a zone that is dangerous to them.

Furthermore, another line of light optionally describes a circle referred to as the "outer circle" that surrounds the inner circle.

The outer circle thus serves to define a safety zone to be maintained relative to the aircraft.

By way of example, the outer circle presents a diameter of not less than twice the diameter of the inner circle, with the inner circle and the circle being concentric.

Furthermore, a line of light may describe a segment that represents a landing axis of the aircraft.

This segment then makes it easier for the aircraft to approach the ground.

In particular, the aircraft comprises a cabin extended by a tail boom, and a line of light describes a segment that is a life-size representation of the tail boom of the aircraft.

The representation of the tail boom gives a visual indication of the horizontal angle of approach of the aircraft towards its landing zone.

Advantageously, the method of the invention can manage to project a light shape referred to as the "projected light shape" that draws an inner circle on the ground representing a rotor of the aircraft at life-size, an outer circle that is concentric around the inner circle and that represents a safety zone, and a segment that represents the tail boom of the aircraft at life-size.

By way of example, the segment representing the tail boom may possess line thickness greater than the line thickness of the circle.

All of the information needed by the pilot or by people on the ground is thus projected onto the ground on the landing zone.

Furthermore, at least one line of light may have brightness that is constant regardless of the position of the projector in air space.

In addition to having dimensions that are constant, the projected light shape drawn on the ground may have brightness that is constant. This characteristic can tend to limit any risk of an individual on the ground being dazzled, for example.

In order to generate a shape on the ground, it is possible to determine an initial light shape that includes each line of light. The initial light shape is then corrected as a function of the position of the projector in air space in order to obtain a corrected light shape, and then the corrected light shape is projected by the projector in order to obtain the projected light shape on the ground with dimensions that do not vary regardless of the position of the projector in air space.

The light shape emitted by the projector is thus the corrected light shape, this corrected light shape giving rise to the projected light shape on the ground.

In the method, an initial light shape is established and then the initial light shape is deformed, where necessary, so that the projected light shape as drawn on the ground possesses dimensions that do not vary.

The width of the lines of light of the initial light shape as drawn on the ground may also be adjusted so as to give the pilot an ideal view of the various lines on the ground.

Furthermore, in order to correct the initial light shape as a function of the position of the projector in air space, the initial light shape may be corrected as a function firstly of information about the distance between the projector and a zone illuminated by the projector, and secondly of information about at least one angle of the projector relative to the ground.

In particular, the initial light shape may be corrected as a function of the angle that is present between the projection axis of the projector and the gravity direction, or the angle that is present between the projection axis of the projector and the ground, assumed to be horizontal.

For example, the initial light shape may be corrected as a function of at least one orientation selected from the following list:

the orientation of the aircraft relative to the terrestrial surface as illustrated by at least one of the following angles: the roll angle, the pitching angle, and the yaw angle of the aircraft in the terrestrial reference frame;

the orientation of the projector relative to the terrestrial surface as illustrated by at least one of the following angles: the roll angle, the pitching angle, and the yaw angle of the projector in the terrestrial reference frame;

the orientation of the projector relative to the aircraft as illustrated by at least one of the following angles: the roll angle, the pitching angle, and the yaw angle of the projector in the reference frame of the aircraft.

In addition, the light shape may be corrected as a function of information representative of the distance between the projector and the zone illuminated by the projector by using at least one parameter from the following list:

the vertical distance in the gravity direction between the projector and the ground, this vertical distance being deduced by way of example from the altitude of the aircraft as delivered by a positioning system known under the acronym GPS and from the altitude of the aircraft above the ground as set manually or as determined automatically by a computer;

the distance between the projector and the shape projected on the ground; and the horizontal distance between the projection in the gravity direction of the aircraft on the ground and the light shape projected on the ground, which horizontal distance may be deduced by way of example by calculation on the basis of the geographical coordinates of the aircraft as supplied by the positioning system and the geographical coordinates of the shape projected onto the ground as set manually or as determined automatically by a computer.

Furthermore, the thickness of at least one line of light may be adjusted on request from a pilot of the aircraft.

In addition to a method, the invention provides a lighting device for marking on the ground a landing zone of an aircraft in flight.

The lighting device comprises a light generator connected to a light processor system of a projector, the lighting device including a processor unit connected to the light processor system and to a measurement system that determines information about the position in air space of the projector, the processor unit applying said above-described method to control the light processor system so as to project onto the ground the projected light shape comprising at least one line of light defining a geometrical surface, the projected light shape being identical regardless of the position of said projector.

The method of the system may in particular determine at least information for identifying the path to be followed by the light shape emitted by the projector. This path may be identified using information about the orientation of the projector and the distance to be traveled.

The processor unit may also comprise a computer unit having at least one processor or the equivalent and a storage unit having at least one non-volatile memory. The computer unit then executes information stored in the storage unit in order to apply the method of the invention as a function of data provided by the measurement system.

The processor unit then determines orders that it transmits to the light processor system or to the light generator. The processor unit determines in particular the shape that is to be projected in order to obtain a projected light shape on the ground that is invariant regardless of the position of the projector.

Thus, by way of example, the processor unit stores information about the position of the projector relative to the zone to be illuminated, and then performs mathematical calculations on the basis of stored relationships to determine the shape that is to be projected as a function of the three-dimensional position of the projector, or indeed of the magnification of a zoom device of the light processor system.

The processor unit may also control the light generator or a filter of the optical processor system so as to adjust the power of the light emitted by the projector or by the light source. This characteristic makes it possible to project a light shape that complies with regulations concerning eye safety for individuals on the ground.

The device may further include one or more of the following characteristics.

Thus, said light generator may include at least one quasi-monochromatic light source.

It is possible to use a laser diode or a light-emitting diode to emit a light beam that is quasi-monochromatic.

The term "quasi-monochromatic" is known to the person skilled in the art and it means that the spectrum of the light beam emitted by the light source has a single emission line occupying a narrow frequency range, e.g. a range of the order of 5 nanometer (nm), for example.

In particular, the light source emits a light beam having a spectrum with an emission line at a frequency in the range 350 nm to 900 nm in order to optimize visual perception in a lighted ambient environment.

Furthermore, the light processor system may include a spatial image encoder and a zoom device arranged downstream from the spatial image encoder.

The term "downstream" should be understood as a function of the propagation direction of the light.

Under such circumstances, the spatial image encoder may comprise, by way of example:

a polarizer, a collimator, and a spatial light modulator known as a liquid crystal display (LCD) or as a liquid crystal on silicon (LCOS) device; or an array of micromirrors known as a digital micromirror device (DMD); or an X-Y beam scanner forming an acousto-optical doublet.

The zoom device may be electrically adjustable, having a lens that can be adjusted electrically, or a lens doublet provided with a lens that slides along an axis.

In another aspect, the light generator may comprise a plurality of quasi-monochromatic light sources.

The device may in particular include a polychromatic system based on a plurality of light sources together with two or more stages of spatial modulation and of light beam recombination in order to generate lines of light that are of different shapes and/or colors. In particular, one line may be represented as a dashed line while another line may be represented as a continuous line.

Furthermore, the lighting device may include a control device controlled by a pilot in order to adjust the thicknesses of the lines projected on the ground, said control device being connected to the processor unit.

In addition, the lighting device may include a turret that is steerable about at least two axes, the projector being carried by the turret.

The projector is thus movable relative to the fuselage of the aircraft. A gyrostabilized platform may be used in addition to the two-axis steerable turret.

The turret may co-operate with a manual control system operated by a pilot, or with a servo-control system making use of the geographical coordinates of the zone to be illuminated in order to enable the projector to point directly at a zone that is specified by its geographical coordinates.

Furthermore, the measurement system may include at least one piece of equipment selected from the following list: a telemeter; a positioning system for determining the three-dimensional position of the aircraft; a system measuring the orientation of the projector relative to the aircraft; a system determining the attitude of the aircraft; a system measuring the orientation of the projector relative to the terrestrial surface; and a manual system enabling an individual to input height information or geographical information.

The measurement system can thus provide information about the orientation of the projector in three dimensions in order to determine a projection axis for the projector along which the projector emits light.

By way of example, the measurement system may measure the three-dimensional orientation of the projector by means of a system for measuring the orientation of the projector relative to the terrestrial surface. For this purpose, it is possible to use an inertial unit or the equivalent and/or sensors, each suitable for measuring a respective angle, such as an inclinometer.

The measurement system may measure the three-dimensional orientation of the aircraft and the orientation of the projector relative to the aircraft. For example, the measurement system may then comprise a system measuring the orientation of the projector relative to the aircraft such as a system having angle sensors, and a system for determining the attitude of the aircraft such as a system comprising an inertial unit or inclinometers, for example.

The measurement system may also comprise a telemeter for measuring distance information about the distance to be traveled by the light emitted by the projector until it reaches the ground.

The measurement system can thus provide information that relates directly to this distance.

Nevertheless, the measurement system may determine this information indirectly by determining a vertical distance between the aircraft and the ground in the gravity direction and a horizontal distance between the projection onto the ground of the aircraft along the gravity direction and the light shape projected onto the ground by the projector.

For this purpose, the measurement system may comprise a positioning system for determining the three-dimensional position of the aircraft and/or a manual system enabling an individual to input height or geographical information.

By way of example, the positioning system may comprise a GPS system for determining the three-dimensional coordinates of the aircraft. These coordinates make it possible in particular to evaluate the height of the aircraft, i.e. the vertical distance between the aircraft and the ground in the gravity direction. The term "ground" should be considered broadly, and in particular it may refer to solid ground or to a liquid surface, as the case may be.

A radio altimeter may also be used for this purpose.

The manual system may include conventional means enabling an individual to set the height of the aircraft and/or the coordinates of the zone to be illuminated, such as a mouse, a keypad, a touch screen, . . . .

The horizontal distance may then be deduced from the coordinates of the aircraft and the coordinates of the zone to be illuminated.

The measurement system may thus comprise a telemeter, a positioning system known under the acronym GPS, or indeed an input member operable by an individual in order to input the value of at least one parameter.

Furthermore, a landing light servo-control system may be used to point a light beam in the same direction as the projector.

In addition to a lighting device, the invention provides an aircraft provided with the lighting device.

BRIEF DESCRIPTION OF THE SEVERAL VIEWS OF THE DRAWINGS

The invention and its advantages appear in greater detail from the following description of embodiments given by way of illustration and with reference to the accompanying figures, in which.

Elements that are present in more than one of the figures are given the same references in each of them.

DETAILED DESCRIPTION OF THE INVENTION

Figure 1:
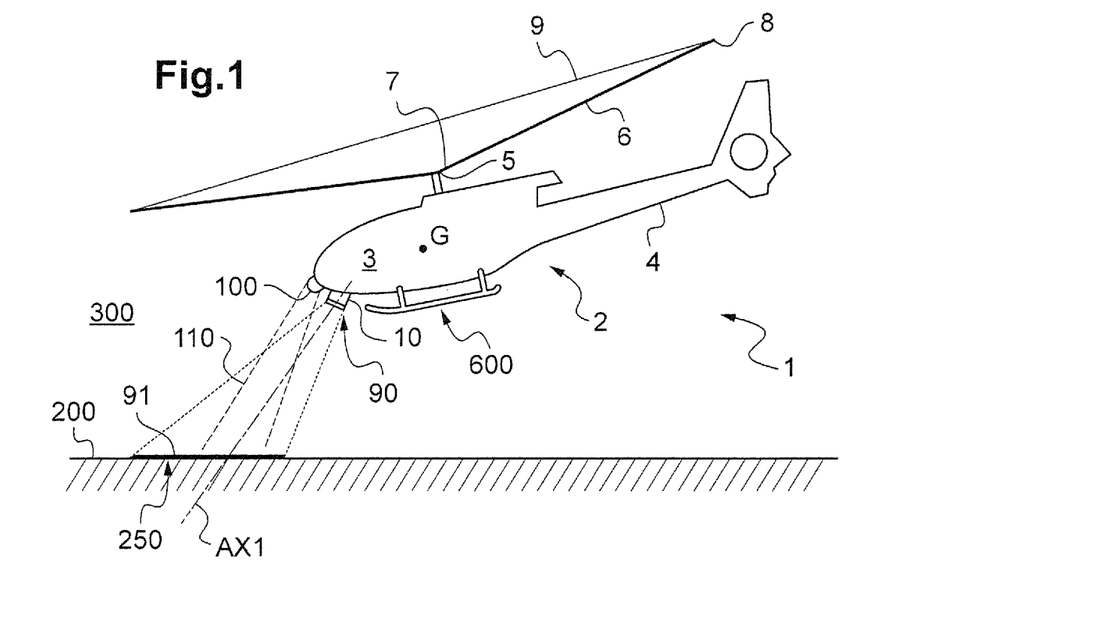
FIG. 1 is a diagrammatic three-dimensional view of an aircraft of the invention.

FIG. 1 shows an aircraft 1 of the invention.

The aircraft 1 has a fuselage 2 that extends longitudinally from a nose towards a tail. Going from the nose towards the tail, the fuselage defines in succession a cabin 3 followed by a tail boom 4.

Furthermore, the fuselage extends upwards in elevation from landing gear 600.

The landing gear 600 shown in FIG. 1 comprises a skid undercarriage. Nevertheless, the landing gear could for example present a ski undercarriage, or indeed a plurality of undercarriages each carrying one or more wheels.

The aircraft 1 also has a rotary wing provided with at least one rotor 5. By way of example, the rotary wing comprises at least one rotor 5 carried by the fuselage 2.

Each rotor of the rotary wing further comprises a plurality of blades 6. Each blade 6 extends spanwise to a free end 8 from a root 7 attached to means for driving the rotary rotation. The free ends of the blades of a rotor move along the periphery of a circle referred to for convenience as the "lift" circle 9.

Furthermore, the aircraft may have at least one landing light 100 that emits a light beam 110.

In addition, the aircraft 1 has a lighting device 10 of the invention. This lighting device 10 emits a light shape referred to as a "emitted light shape" 90 so as to project a light shape referred to as the "projected light shape" 91 onto a landing zone 250 of the ground 200 it is flying over. The emitted light shape is also referred to below as the "corrected light shape".

Figure 2:
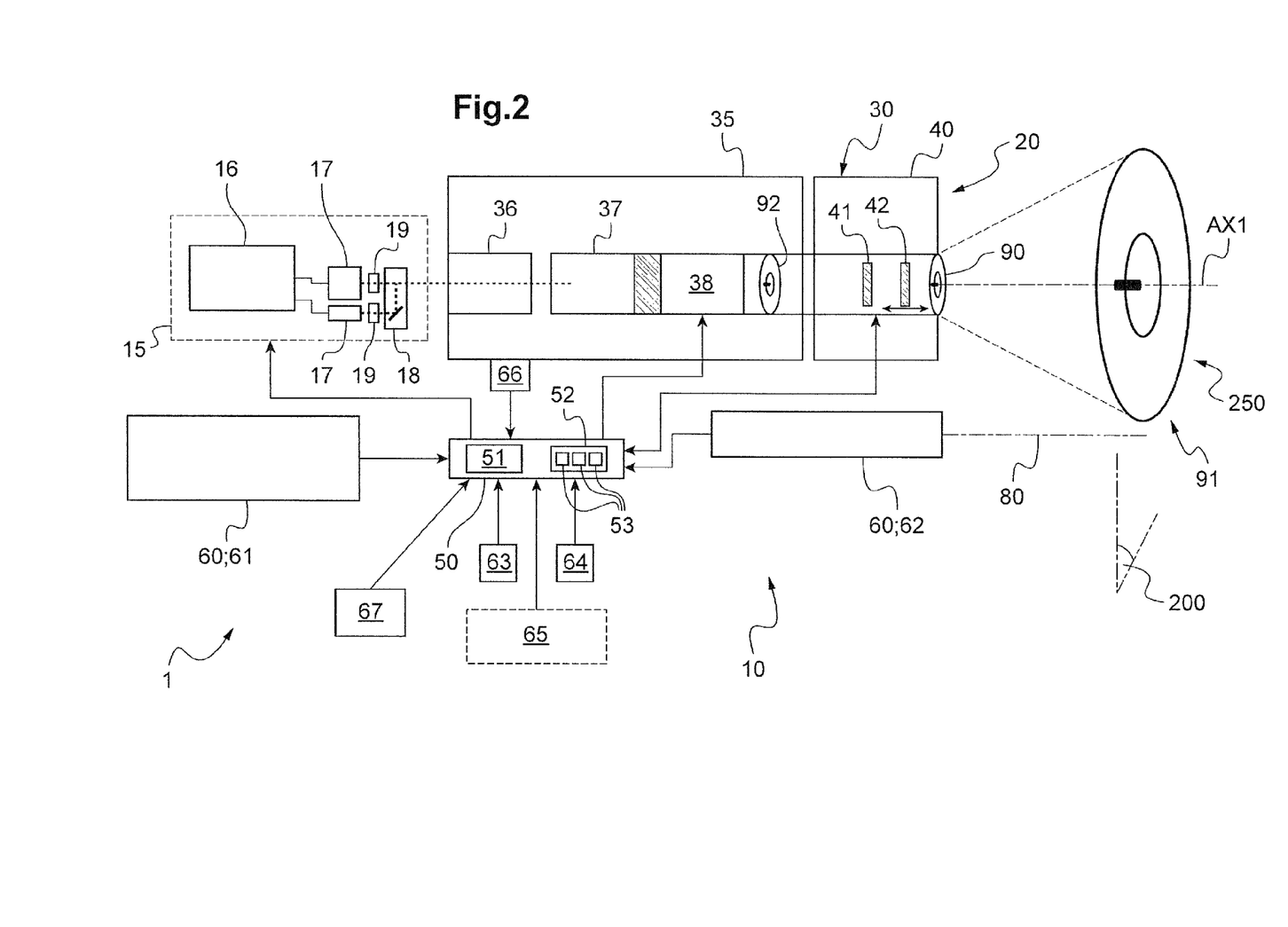
FIG. 2 is a diagrammatic view of a lighting device of the invention.

With reference to FIG. 2, the lighting device 10 comprises a light generator 15 that is optically connected to a light processor system 30 of a projector 20. The light generator 15 and the projector 20 are controlled by a processor unit 50.

The light generator may be separate from the projector 20, or it may form part of the projector 20.

The light generator 15 comprises at least one light source 17 connected to an electrical power supply system 16. Each light source 17 can emit light that is quasi-monochromatic. By way of example, each light source 17 comprises a laser diode, or indeed a light-emitting diode.

In the presence of a plurality of light sources 17, the lighting device may include a combiner 18, e.g. within the light generator 15.

In addition, the lighting device may include at least one light modulator system 19, e.g. one modulator system per light source 17.

The light generated by the light generator is then transmitted to a light processor system 30 of the projector 20 so as to be shaped. The projector then transforms the light generated so as to generate a corrected light shape 90 at the outlet from the projector 20. This corrected light shape 90 then gives rise to a projected light shape 91 on the ground 200.

The lighting device may include a polarizer 36 arranged upstream from the light processor system 30 or else within the light processor system 30. The polarizer may form part of the projector or it may be separate therefrom.

Furthermore, the light processor system 30 may include a spatial image encoder 35 followed by a zoom device 40 for generating the corrected light shape 90.

The spatial image encoder 35 may be situated in alignment with the zoom device 40 acting as a projection system. Nevertheless, the spatial image encoder 35 may be separate from the zoom device 40 for reasons of overall size, the projector then having at least one light reflector means for optically connecting the spatial image encoder 35 and the zoom device 40.

Under such circumstances, the spatial image encoder 35 shown in FIG. 2 is provided with a collimator 37 and with a spatial light modulator 38 for generating a light shape referred to as an "intermediate light shape" 92.

Alternatively, the spatial image encoder 35 may optionally include a matrix of micromirrors, or an X-Y beam scanner.

The intermediate light shape is then optically transmitted to the zoom device. By way of example, this transmission may take place through air, the intermediate light shape being projected towards the zoom device 40.

The zoom device 40 may be a conventional device. For example, the zoom device 40 may comprise a stationary lens 41 and a movable lens 42. The outlet from the zoom device generates the corrected light shape 90 that is projected by the projector 20.

In order to control the light generator 15 and the light processor system 30, the lighting device 10 is provided with a processor unit 50.

The processor unit 50 thus transmits control orders over wired or wireless connections to the light generator 15 and to the light processor system 30. Such orders may be in the form of electrical or computer signals.

The processor unit 50 is provided with a storage unit 52. By way of example, the storage unit 52 possesses a plurality of memories 53, and in particular a non-volatile memory storing instructions for executing and a volatile memory storing data resulting from measurements or settings input by an individual.

Furthermore, the processor unit 50 is provided with a computer unit 51. This computer unit may include at least one processor, or the equivalent, the processor executing instructions stored in the storage unit 52.

In particular, on receiving an order from a pilot the processor unit 50 transmits orders for switching the light generator 15 off or on. By way of example, a pilot may use a button for switching the light generator 15 off or on. By way of example, the processor unit then operates a switch of the electrical power supply system 16.

Likewise, the processor unit 50 can transmit orders to the light generator 15 in order to adjust the light intensity of the projected light shape 91 so as to avoid dazzling any individuals present on the ground 200. The processor unit then controls the light sources 17, e.g. so as to reduce or increase the intensity of the light generated by at least one light source.

In addition, the processor unit can transmit orders to the spatial image encoder 35 and/or to the zoom device 40 in order to project the projected light shape 91 onto the ground.

For this purpose, the processor unit 50 is connected to a measurement system 60 that determines information relating to the position of the lighting device 10 in air space, and in particular information relating to the position of the projector 20.

This measurement system serves in particular to enable the lighting device to determine at least one distance relating to the distance that is to be traveled by the light between the projector and the ground, and at least one angle enabling a projection axis followed by the light and of the projector to be positioned relative to the ground.

Using this data, the processor unit calculates the values of adjustment settings and transmits orders to the light generator and to the light processor system 30 in order to obtain the desired projected light shape 91.

For this purpose, the manufacturer draws up mathematical formulas in application of known geometrical rules, or else performs tests or simulations.

Alternatively, at least one database provides appropriate settings as a function of data collected by the measurement system 60. The database may be obtained by testing or by simulation.

The measurement system 60 may include a telemeter 62. The telemeter may be carried by the projector in order to determine directly the distance 80 along a straight line between the projector 20 and the zone 250 on the ground that is illuminated by the projector. Such an illuminated zone represents a target landing zone for the aircraft.

Figure 3:
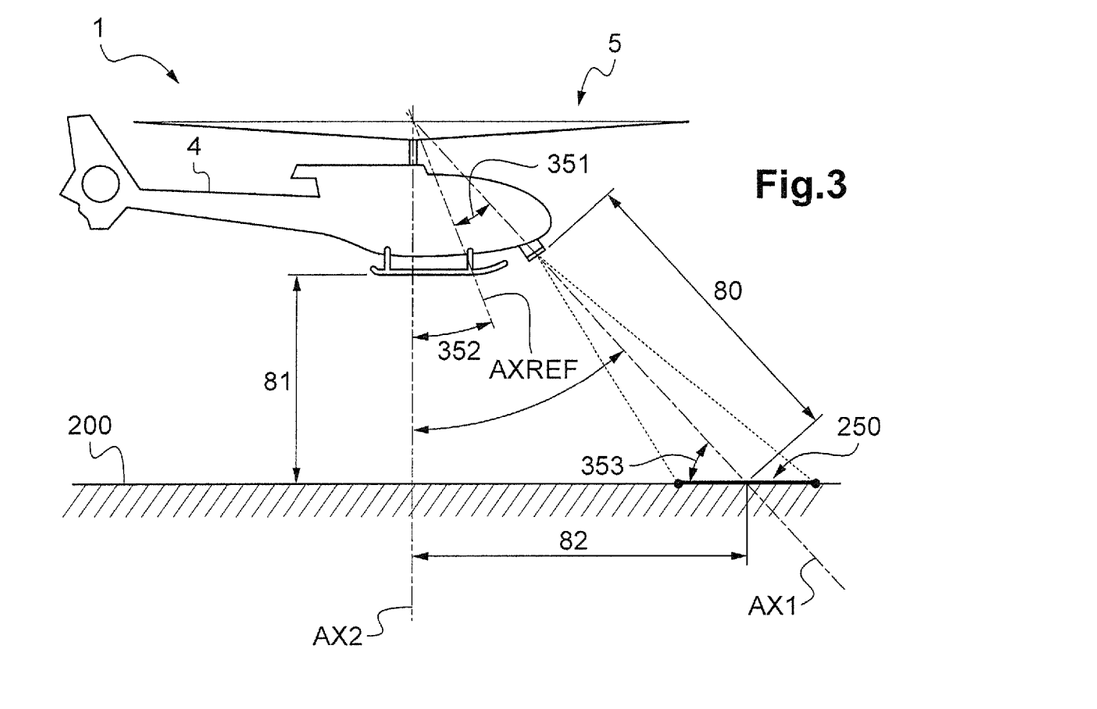
FIG. 3 is a view showing the operation of a measurement system of the lighting device.

Alternatively, and with reference to FIG. 3, a telemeter or a radio altimeter may also measure the height 81 of the aircraft.

Under such circumstances, a system 67 shown in FIG. 2 can be used by an individual in order to input the coordinates of the zone 250 that is to be illuminated.

Furthermore, as can be seen in FIG. 2, the measurement system may include a positioning system 63 for determining the three-dimensional position of the aircraft 1, such as a GPS system or the equivalent, in order to determine the coordinates of the aircraft in the terrestrial reference frame.

The processor unit can then deduce from these geographical coordinates a horizontal distance 82, or indeed the height 81. The height 81 and the horizontal distance 82 are then together representative of the distance 80 along a straight line between the projector 20 and the zone 250 illuminated by the projector.

With reference to FIG. 2, the measurement system may include a system 61 for measuring the orientation of the projector relative to the aircraft 1.

The term "orientation of the projector" refers to the orientation of the projection axis AX1 of the projector, where the projector emits light along the projection axis AX1.

With reference to FIG. 3, the system 61 for measuring the orientation of the projector relative to the aircraft 1 can measure at least one angle 351 between said projection axis AX1 and a reference axis AXREF of the aircraft. Such a system 61 for measuring the orientation of the projector relative to the aircraft 1 may include an angle sensor, for example.

By way of example, the system 61 measures at least one of the following angles: the roll angle of the projector relative to the roll axis of the aircraft; the pitching axis of the projector relative to the pitching axis of the aircraft; and the yaw angle of the projector relative to the yaw axis of the aircraft.

With reference to FIG. 2, the measurement system may include a system 64 for determining the attitude of the aircraft, i.e. the roll angle, the pitching angle, and the yaw angle of the aircraft.

With reference to FIG. 3, the system 64 for determining the attitude of the aircraft can measure at least one angle 352 between a reference axis of the aircraft and a terrestrial reference frame, for example the gravity axis AX2.

Consequently, the system 61 for measuring the orientation of the projector relative to the aircraft 1 and the system 64 for determining the attitude of the aircraft together make it possible for the processor unit to position the projection axis AX1 in the terrestrial reference frame.

With reference to FIG. 2, the lighting device may include a system 66 for measuring directly the orientation 353 of the projector 20 relative to the terrestrial surface visible in FIG. 3.

Optionally, and with reference to FIG. 2, the system may include a manual system 67 enabling an individual to input the geographical coordinates of the zone that is to be illuminated.

Furthermore, the lighting device 10 may include a control device 65 that is controlled by a pilot to adjust the thicknesses of the lines projected on the ground by the projector. The control device 65 is connected to the processor unit 50. The control device may comprise a mouse, a keypad, a touch screen, a button, a voice system, . . . .

Figure 4:
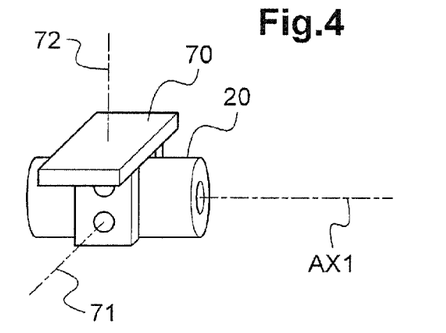
FIG. 4 is a view of a turret of a lighting device.

Furthermore, and with reference to FIG. 4, the lighting device 10 includes a turret 70 for pointing the projection axis AX1 of the projector 20. The turret can be steered about at least two axes 71 and 72 using conventional motor-driven means. Under such circumstances, the projector 20 is carried by the turret 70.

Figure 5:
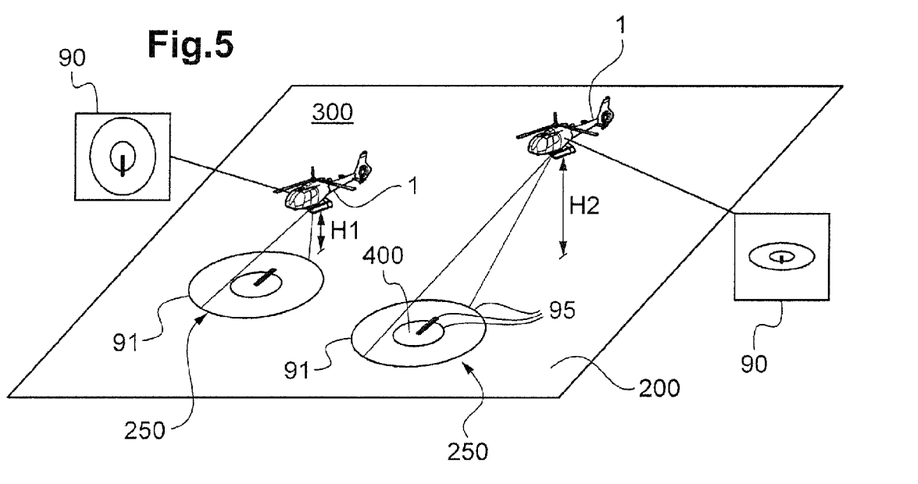
FIG. 5 is a view explaining the method of the invention.

In the method applied by the lighting device, and with reference to FIG. 5, the aircraft 1 uses a projector 20 to project a projected light shape 91 onto the ground.

The projected light shape 91 includes at least one line of light 95 that defines a geometrical surface 400. The geometrical surface 400 represents a target landing zone for the aircraft, the aircraft 1 being maneuvered to place at least part of its landing gear on the geometrical surface 400.

Furthermore, the projected light shape 91 remains identical regardless of the position of the projector 20 in air space 300.

Specifically, the processor unit of the lighting device controls the lighting device so that the projected light shape 91 remains identical regardless of the position of the projector 20 in air space 300.

FIG. 5 shows this aspect by presenting the aircraft 1 at two different heights H1 and H2.

As a function of the position of the projector, the corrected light shape 90 emitted from the outlet of the projector varies so that the projected light shape 91 drawn on the ground nevertheless retains dimensions that are constant. For each position of the aircraft shown in FIG. 5, FIG. 5 shows the corrected light shape 90 and the projected light shape.

In order to obtain this result, an initial light shape includes each of the lines of light. This initial light shape is then corrected as a function of the position of the projector 20 in air space 300 in order to obtain the corrected light shape 90.

The projector can be adjusted to project an initial light shape, i.e. a shape by default. The processor unit can determine control orders for transmission to the projector and/or to the light generator in order to correct the initial light shape as a function of the position of the projector 20 in air space 300.

The corrected light shape 90 is then projected by the projector so as to obtain the required projected light shape 91 on the ground.

The initial light shape may be corrected as a function firstly of information about the distance between the projector and a zone illuminated by the projector, and secondly of information about at least one angle of the projector relative to the ground.

Figure 6:
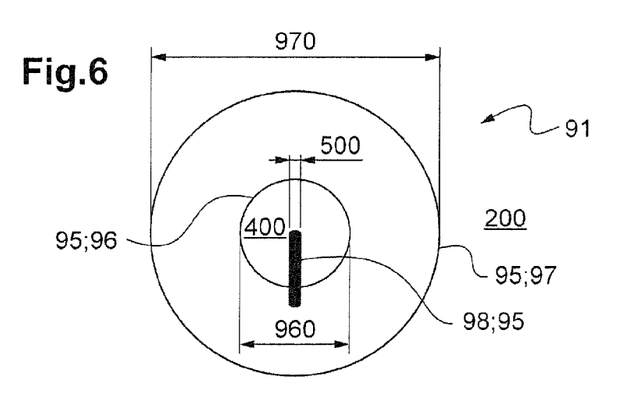
FIGS. 6 and 7 are views showing a projected light shape.

Furthermore, and with reference to FIG. 6, at least one line of light 95 describes a circle of light 96, 97. Under such circumstances, at least one circle defines a surface 400 on which the aircraft 1 is to be landed.

In addition, at least one line of light may represent a projection on the ground of a member of the aircraft shown life-size, this projection being arranged in register with the location that is to be occupied by that member after landing.

Such a member may be a tail boom or a rotor of the aircraft 1.

Thus, a line of light 95 represents a circle of light referred to as the "inner circle" 96 that corresponds to a life-size projection on the ground of the lift circle 9 once landing has been achieved.

A line of light 95 may also form a segment 98 that represents a landing axis for the aircraft 1. In particular, this segment 98 may represent the projection onto the ground, at life-size, of the tail boom 4 of the aircraft 1 after landing has been achieved.

Finally, a third line of light may form a circle referred to as the "outer circle" 97 surrounding the inner circle 96. The inner circle 96 and the outer circle 97 are concentric. In addition, the outer circle 97 may present a diameter 970 that is at least twice the diameter 960 of the inner circle 96.

In the applied method, at least one line of light is of brightness that is constant regardless of the position of the projector 20 in air space 300. Furthermore, the thickness 500 of at least one line of light is adjustable on request by a pilot.

Figure 7:
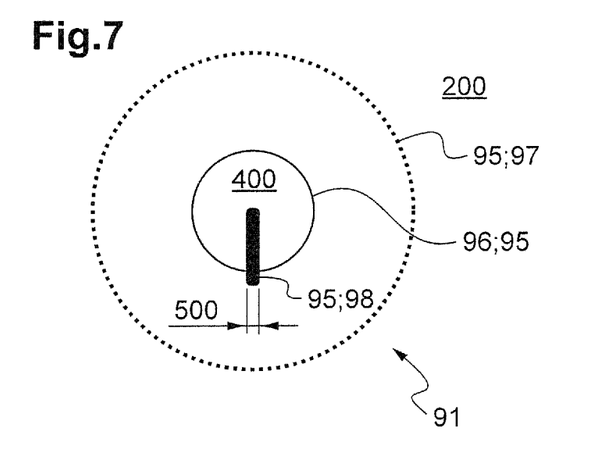

With reference to FIG. 7, two distinct lines of light may have colors and/or shapes that are different.

In the example of FIG. 7, the inner circle is in the form of a continuous line of green color, whereas the outer circle is in the form of a dashed line of red color, for example.

Figure 8:
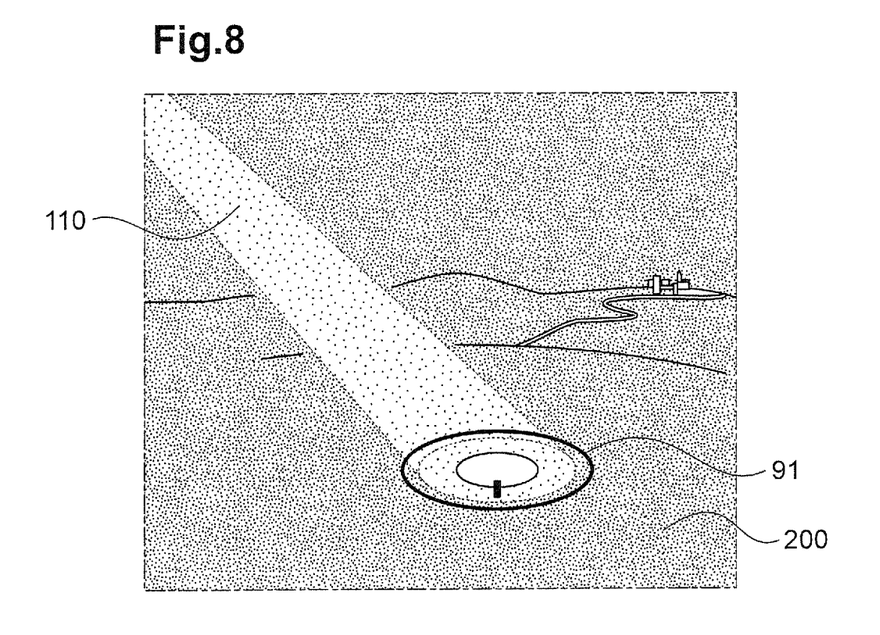
FIG. 8 is a view explaining a variant of an aircraft having a lighting device of the invention and co-operating with a landing light.

Finally, and with reference to FIG. 8, the lighting device may be coupled with a landing light, the landing light projecting a light beam 110 towards the projected light shape 91. A landing light servo-control system may be used to point a light beam from the landing light in the same direction as the projected light shape emitted by the projector.

Naturally, the present invention may be subjected to numerous variations as to its implementation. Although several embodiments are described, it will readily be understood that it is not conceivable to identify exhaustively all possible embodiments. It is naturally possible to envisage replacing any of the means described by equivalent means without going beyond the ambit of the present invention.

What is claimed is:

1. A method of marking a landing zone on the ground for an aircraft in flight, the landing zone being targeted by the aircraft flying at a height lying between a predefined maximum height and a predefined minimum height, in which method the aircraft uses a projector on-board the aircraft to project on the ground a projected light shape having at least one line of light defining a geometrical surface, the aircraft tending to place at least a portion of landing gear of the aircraft on the geometrical surface, the projected light shape being identical regardless of the position of the projector in air space.

2. The method according to claim 1, wherein the at least one line of light includes a line of light that describes a circle of light, the aircraft tending to place at least a portion of landing gear of the aircraft inside the circle of light.

3. The method according to claim 1, wherein the at least one line of light includes a line of light that represents a life-size projection on the ground of a member of the aircraft, the life-size projection on the ground being located in register with the location that ought to be occupied by the member of the aircraft after landing.

4. The method according to claim 3, wherein the aircraft includes a rotary wing having blades, the blades having respective free ends that in rotation describe a lift circle, and wherein the at least one line of light includes a line of light that describes an inner circle of light that represents a life-size projection onto the ground of the lift circle.

5. The method according to claim 4, wherein the at least one line of light includes a line of light that describes an outer circle that surrounds the inner circle, the inner circle and the outer circle being concentric.

6. The method according to claim 5, wherein the outer circle presents a diameter that is not less than twice the diameter of the inner circle.

7. The method according to claim 1, wherein the at least one line of light includes a line of light that describes a segment that represents a landing axis of the aircraft.

8. The method according to claim 1, wherein the aircraft comprises a cabin extended by a tail boom, and the at least one line of light includes a line of light that describes a segment that is a life-size representation of the tail boom of the aircraft.

9. The method according to claim 1, wherein the at least one line of light has brightness that is constant regardless of the position of the projector in air space.

10. The method according to claim 1, wherein an initial light shape is determined that includes each line of light of the at least one line of light, and the initial light shape is corrected as a function of the position of the projector in air space in order to obtain a corrected light shape, and then the corrected light shape is projected by the projector in order to obtain the projected light shape on the ground with dimensions that do not vary regardless of the position of the projector in air space.

11. The method according to claim 10, wherein to correct the initial light shape as a function of the position of the projector in air space, the initial light shape is corrected as a function of information about the distance between the projector and a zone illuminated by the projector, and as a function of information about at least one angle of the projector relative to the ground.

12. The method according to claim 1, wherein the thickness of the at least one line of light is adjusted on request from a pilot of the aircraft.

13. A lighting device for marking a landing zone on the ground for an aircraft in flight, wherein the lighting device comprises a projector having a light processor system, a light generator connected to the light processor system, a measurement system that determines information about the position of the projector in air space, and a processor unit connected to the light processor system and to the measurement system, wherein the processor unit is configured to control the light processor system so as to project from the projector onto the ground a projected light shape having at least one line of light defining a geometrical surface with the projected light shape being identical regardless of the position of the projector in air space.

14. The lighting device according to claim 13, wherein the light generator includes at least one quasi-monochromatic light source.

15. The lighting device according to claim 13, wherein the light processor system includes a spatial image encoder and a zoom device arranged downstream from the spatial image encoder.

16. The lighting device according to claim 13, wherein the lighting device further comprise a control device controlled by a pilot in order to adjust the thicknesses of the at least one line of light, the control device being connected to the processor unit.

17. The lighting device according to claim 13, wherein the lighting device further comprises a turret that is steerable about at least two axes, the projector being carried by the turret.

18. The lighting device according to claim 13, wherein the measurement system includes at least one piece of equipment selected from the following list: a telemeter; a system for three-dimensionally positioning the aircraft; a system measuring the orientation of the projector relative to the aircraft; a system determining the attitude of the aircraft; a system measuring the orientation of the projector relative to the terrestrial surface; and a manual system enabling an individual to input height information or geographical information.

19. The lighting device according to claim 13, wherein the light generator includes a plurality of quasi-monochromatic light sources.

20. An aircraft comprising:
a lighting device for marking a landing zone on the ground, the lighting device including a projector having a light processor system, a light generator connected to the light processor system, a measurement system to determine information about the position of the projector in air space, and a processor unit connected to the light processor system and to the measurement system, wherein the processor unit is configured to control the light processor system so as to project from the projector onto the ground a projected light shape having at least one line of light defining a geometrical surface with the projected light shape being identical regardless of the position of the projector in air space.

* * * * *